United States Patent [19]
Jones

[11] Patent Number: 6,055,246
[45] Date of Patent: Apr. 25, 2000

[54] ADDITION OF TIME INFORMATION

[75] Inventor: Alan Henry Jones, Cambridge, United Kingdom

[73] Assignee: Olivetti Research Limited, Cambridge, United Kingdom

[21] Appl. No.: 08/913,794

[22] PCT Filed: Mar. 15, 1996

[86] PCT No.: PCT/GB96/00645

§ 371 Date: Sep. 17, 1997

§ 102(e) Date: Sep. 17, 1997

[87] PCT Pub. No.: WO96/29702

PCT Pub. Date: Sep. 26, 1996

[30]     Foreign Application Priority Data

Mar. 17, 1995 [GB]  United Kingdom .................. 9505417

[51] Int. Cl.[7] .............................. H04L 12/54; H04J 3/06; H01J 13/00
[52] U.S. Cl. .......................... 370/503; 370/394; 370/428; 370/429; 370/503; 395/200
[58] Field of Search ..................... 370/394, 428, 370/429, 412, 522; 395/200; 386/95, 83, 126, 125, 65

[56]              References Cited

U.S. PATENT DOCUMENTS

| 5,440,336 | 8/1995 | Buhro et al. ........................ 348/13 |
| 5,602,992 | 2/1997 | Danneels ........................ 395/200.19 |
| 5,617,502 | 4/1997 | Ort et al. ........................ 386/97 |
| 5,619,337 | 4/1997 | Naimpally ........................ 386/83 |
| 5,668,601 | 9/1997 | Okada et al. ........................ 348/423 |
| 5,719,982 | 2/1998 | Kawamura et al. ........................ 386/65 |

*Primary Examiner*—Huy D. Vu
*Assistant Examiner*—M. Phan
*Attorney, Agent, or Firm*—Lee, Mann, Smith, McWilliams, Sweeney & Ohlson

[57]              ABSTRACT

A method of adding time information to a data stream is provided. First and second timing sequences are linked with the data stream. The first timing sequence provides a permanent time record of when the data in the stream first originated. The second timing sequence is re-writable when the data stream is altered, for example by editing, so as to ensure an internally consistent time track is provided each time the data stream is changed. The timing sequences are derived from absolute references such as Global Positioning System (GPS) Time. The first and second timing sequences may be stored separately to the data stream. Two or more sets of second timing sequences may be provided, corresponding to different presentations of common sets of data streams.

18 Claims, 2 Drawing Sheets

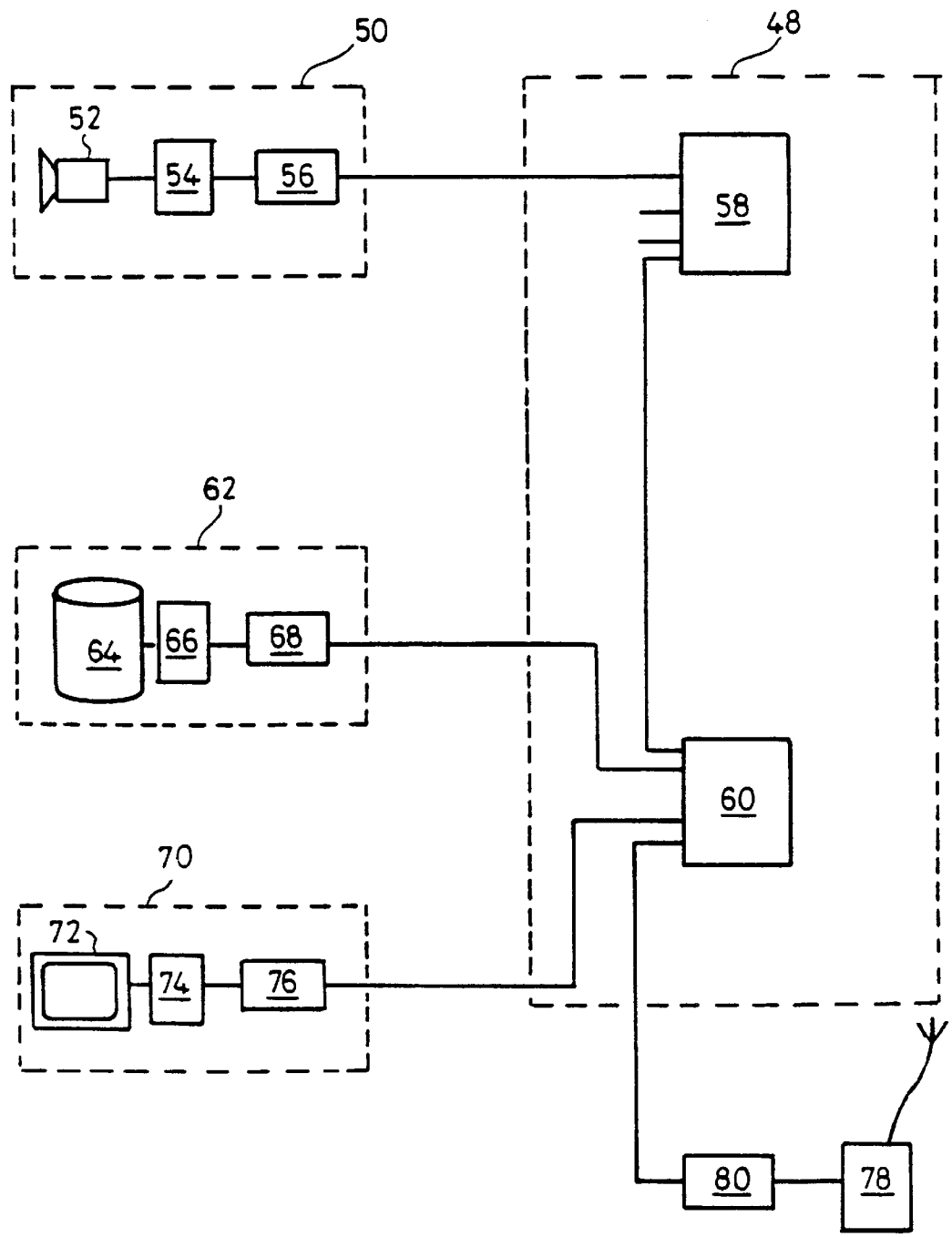

ADDITION OF TIME INFORMATION

FIELD OF THE INVENTION

This invention relates to the addition of time information to data streams such as multimedia data streams, to facilitate editing and replay of the data.

BACKGROUND TO THE INVENTION

Timestamps on multimedia data streams enable time information to be associated with the data representing audio, video or other time dependent media. Recorded streams may require alteration as to rate of play, synchronisation with other streams or editing. The use of timestamps embedded in the streams provides a marker for controlling such operations.

For example timestamps embedded in a data stream can be used to meter the playback rate to ensure that the stream runs at the desired rate. Additionally if several streams are recorded simultaneously and require editing, then operations such as cuts may be required at a particular recorded time on each stream. The use of a timestamp ensures that the cuts can be precisely synchronised.

Timestamps are used within current video tape formats and DAT formats. Timing information in actual time (GMT) is typically laid down with the audio and video streams as they are recorded. Subsequent editing of the streams results in a time track with discontinuities where cuts have been made, and 'false' timing data where inserts have occurred, so that during subsequent playback the timestamps do not bear a simple relationship to the times at which the data should be played.

To avoid this a fresh time track may be laid down when editing, with the time at which the edits were made. The original timestamps are thus overwritten so that a new consecutive series of timestamps is available. This approach loses all information about when the original recordings were made, so that additional tracks cannot be synchronised with the edited sequence, further editing will lead to cumulative errors, and recordings cannot be indexed by when they were made.

Instead of timestamping with actual time (GMT), relative timestamps can be used. These are relative times with independent origins and are linked to every data segment (whether audio or video) by the hardware that captures the data. These timestamps often exhibit drift since the electronic clocks in different hardware do not necessarily run with sufficient accuracy. When streams are edited, new sets of relative timestamps are laid down so that the playout software does not have to take care of discontinuities where the edits have been made.

SUMMARY OF THE INVENTION

According to one aspect of the invention a method of adding time information to a data stream comprises the steps of linking first and second timing sequences with the data stream, the first sequence providing a permanent time record of when the data first originated and the second sequence being re-writable when the data stream is changed as during editing, such that time information in the first sequence provides a permanent record of the originating time which is always maintained with any data preserved from the original stream, whilst the second sequence provides an internally consistent timetrack which is updated each time the data stream is changed so as to be consistent with any derivative of the original data stream, for subsequent replay and editing purposes.

The timing sequences may be generated and transmitted with the data stream.

Where the data stream is to be edited "on line", the data stream and timing sequences are preferably buffered before being transmitted to reproduction apparatus.

Where the data stream is to be edited from a recorded condition, the data stream and timing sequences may be recorded in a synchronous or linked manner and the timing sequence information may be embedded in the data stream.

The first and second timing sequences may be embedded into the data stream together or the second timing sequence may be embedded into the data stream after the first timing sequence. Alternatively the timing sequences may be stored separately from the data stream.

In the recorded condition, the second timing sequence may be re-recorded when, and if, the data stream is subsequently edited, so that a consistent time sequence is ensured with no discontinuities, to facilitate subsequent replay and editing of the data stream.

In a preferred embodiment of the invention the first permanent timing sequence is derived from an absolute reference such as, for example, Universal Coordinated Time (UTC) or Global Positioning System(GPS) Time.

UTC introduces leap seconds to remain synchronised to the rotation of the Earth. This complicates any software that deals with the smooth flow of data streams or calculates the times between data samples. Accordingly the use of GPS Time is preferred as this system avoids the introduction of leap seconds and is easily related to UTC, following UTC to within 363 ns(95%) plus the accumulated leap second offset.

The second timing sequence is preferably in relative time units such as GPS seconds.

The timing information provided in the timing sequences may be provided by a series of timestamps.

The timestamps are preferably applied using a 64 bit time data format.

Each timestamp preferably comprises a 64 bit word. This 64 bit word may be interpreted as a 2's complement binary representation in units of $2 \times 10^{-32}$ second. This permits negative times to be handled in the same format as positive times during calculations.

The series of timestamps may be positioned along the data stream with varying spacing, or granularity. Thus for example the granularity can be altered independently of the timestamp precision.

The first and second timing sequences may have different granularities.

The methods as aforesaid may be applied to a plurality of data streams, thus permitting linking of data streams, for example a separate video data stream and audio data stream of common originating time with timing sequences applied according to the methods as aforesaid can be replayed in synchronism due to the identical first timing sequences applied to the data streams.

This may be of particular use for synchronisation of live streams.

In accordance with a further aspect of the method of the invention, three or more timing sequences may be stored with the data. This permits the storage of two or more sets of second timing sequences, each of which corresponds to a different presentation of common sets of data streams. The first timing sequence will be common to all the presentations. Where more than two second sequences are to be stored, some or all of the time sequences may be stored separately from the data streams.

The invention also lies in apparatus for performing the aforesaid methods.

The invention will now be described by way of example with reference to the accompanying drawings in which:

FIG. 3 shows a schematic view of timing sequences applied using an ATM (Asynchronous Transfer Mode) network.

DESCRIPTION OF EMBODIMENT

FIG. 1 shows schematic views of timing sequences comprising a series of timestamps being applied and used in connection with data streams.

Figure 1A:
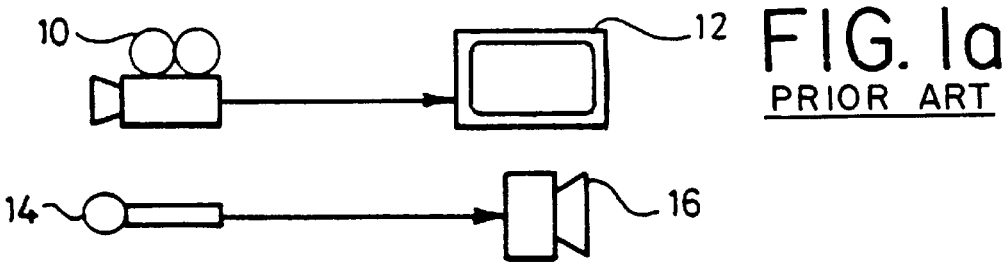
FIG. 1 shows schematic views of apparatus which uses timing sequences, FIGS. 1a) and b) being schematic views of apparatus which applies timing sequences to live data streams and to data streams as recorded, and FIG. 1c) is a schematic view of apparatus for editing data streams.

FIG. 1a) shows the application of timestamps to live data streams in accordance with the invention. A video camera 10 is used to convert an optical scene into a live video data stream which can be recorded in known manner for subsequent display as on a screen 12. A microphone 14 converts sound waves into a "sound" data stream which can also be recorded in known manner and replayed via a loudspeaker 16. As the data is transmitted from the camera 10 and the microphone 14, first and second timing sequences are linked to the data streams.

The first timing sequence is an absolute time system and contains source timestamps. These timestamps are set to the time at which data is captured and are synchronised to Global Positioning System (GPS) time so as to be compatible with international timing systems such as Universal Coordinated Time (UTC). The source timestamps can be regarded as part of the data, just as much as the data describing the pixels making up the image or the waveform samples making up the audio signal. The source timestamps are permanent and not changed by editing or filing operations.

The second timing sequence contains playback timestamps. These define relative times at which data is to be replayed. The playback timestamps are not related to any particular time origin but are in standard time units of GPS seconds. The playback timestamps indicate the times at which the data in a recorded stream is to be replayed, thus for example allowing alteration in the play back speed of clips and insertion of pauses. To this end, apparatus reproducing the data streams as picture(s) and/or sound are controlled by the playback timestamps.

The data streams typically comprise a series of data segments. The source timestamp can be embedded into the data segments initially with the playback timestamp embedded later, for example when the streams are recorded onto a data store.

Alternatively during the initial recording of the live data streams, the source and playback timestamps embedded together and with the same values made identical, so that if replayed the data will be played back at the same rate and in the same order in which it was recorded.

In FIG. 1a) the data players, for instance displays 12 and loudspeakers 16, hold the live data with playback timestamps SP until real time TR reaches SP=TOff, where TOff is set identically for all players according to the maximum delay expected for any link, or adaptively by observing how close any player's buffers have come to emptying. This permits synchronisation of live sound and video data streams, for example when data is transmitted over a satellite link.

Figure 1B:
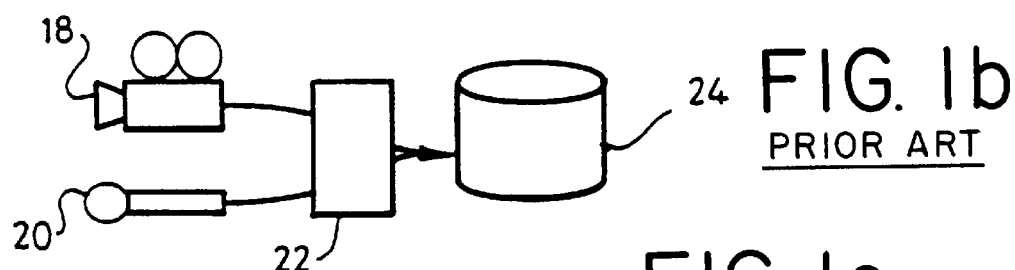

FIG. 1b) shows a schematic view of time sequences being recorded onto data streams for storage. A video camera 18 and microphone 20 transmit the data stream and the data processing apparatus 22 applies the timestamps. The spacing of individual timestamps in a time sequence, i.e. the granularity, can be varied independently of the timestamp precision. Times for data between timestamps may be deduced from knowledge of sampling rates. In a system where one or several data samples are passed as a single message, timestamps can be incorporated in all messages, some messages, or in special messages interleaved with the data.

The timestamps may be stored separately from the data stream. By referencing each timestamp to a byte in the corresponding data stream to which they refer, it is possible to use timestamps with older incompatible data storage hardware. At playback, the required video byte is selected and the timestamps supplied from a timestamp index by use of the video byte reference number.

The source and playback timestamps may be kept together, or can be introduced at different granularities according to the application.

The timestamps are observed somewhere in the data processing apparatus 22, and the data flow controlled accordingly. The data streams are stored with the applied time sequences on a storage means 24 and played out later as described, for example, in connection with FIG. 2.

For replay of stored streams, the replay device computes a time offset from the current real time TR be used by the players. For instance, if the streams to be played all start with timestamp S, and are to be played with all playback timestamps synchronised, and the time that the display is to start is T, then the data with playback timestamp SP should be held at the display until TR reaches SP+TOff where TOff=T−S. The offset thus allows users to skip backwards or forwards in a recording.

Figure 1C:
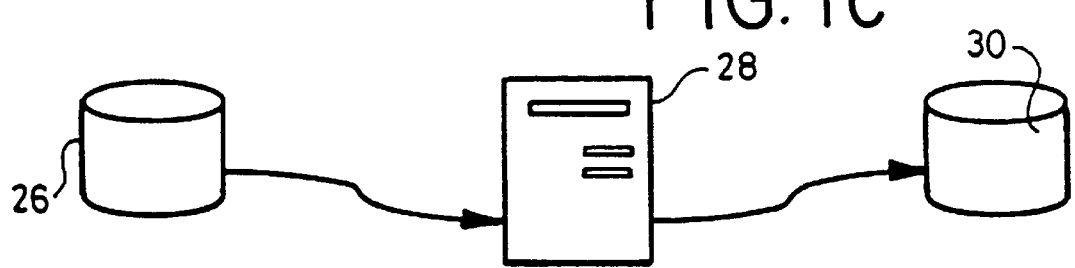

FIG. 1c) shows a schematic view of editing the data streams. The data including source and playback timestamps are recorded on the storage media 26 with no special attention given to the timestamps, as for example shown in FIG. 1b. Editing of the data stream occurs at the editing suite 28.

During editing the data stream is given a new set of playback timestamps that define the relative times at which each timestamped section of data is to be played. The cut and edited data stream is joined to give an edited data stream 30. The original first timing sequence with the source timestamps remains, with jumps in the track where data has been edited.

The second timing sequence containing the playback timestamps is re-written by, for example, deriving a signal from the source timestamps via offsets. The re-written second timing sequence provides a consistent time track for playback purposes without any jumps in it. This removes cumulative errors where the precise times of cut points differ because of incompatible sampling rates.

If several video clips are to be spliced together and an accompanying audio track is to be added, the source timestamps can be used by a computer system to determine which parts of the video have associated audio tracks. The computer edits together the exactly corresponding sounds to any given video clip without the need for manual alignment after each cut.

Figure 2:
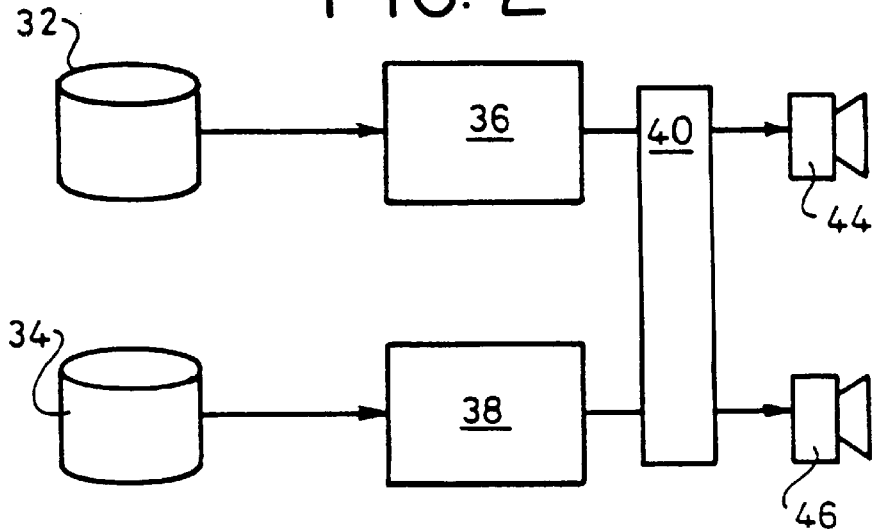
FIG. 2 is an example of time gating applied to data streams.

During editing of a collection of streams that are to be synchronised, the playback timestamps may be set on a common basis so that only a single time offset needs to be computed as in the case of unedited streams. This is performed by a controlling system interacting with time gating modules as shown in FIG. 2. Alternatively the synchronised playback can be initiated by giving an offset to be maintained between the playback timestamps of each stream and real time. The offsets can be enforced in the destination machine such as a video display or loudspeaker driver, but in simpler systems the offsets can be enforced as data is released from playback devices.

In FIG. 2 stored data streams 32,34 are fed into time gates 36,38. The time gates 36,38 initialise with the largest possible time offset TOff so that no data will be played out. The time gates 36,38 read the input streams until the first timestamp is encountered. This is held (as the playout time will be a long way in the future), and its value is available as an attribute of the gate module.

A controlling system 40 reads the current timestamp values as supplied by the time gates 36,38 from all the streams that are to be synchronised, and from these values determines at what time offset to play the media stream to loudspeakers 44,46.

As an example of how offsets can be used, the initial playback timestamps may be 941 and 946, and known to be relative to the same timebase. The controlling system 40 reads the actual time from the gate modules 36,38, or some other source, and this may be 1000. The controlling system 40 subtracts the current timestamps from the current time and adds a time quantity, for example 1 unit, to ensure that every piece of data in the two streams is seen. The playback offset for each timegate is set according to the earliest playback timestamp (941), and so is set to $$1000-941+1=60.$$

This offset causes stream 32 to start at time 941+60=1001, and stream 34 to start at 946+60=1006. At time 1010 both streams are running.

If the streams 32,34 are to be started simultaneously, then the later of the start playback timestamps is taken and the playback offset set to 1000−946+1=55.

The controlling system 40 identifies that stream 32 is late, and forwards the stream, discarding data, until the playback timestamp of stream 32 reaches 946 at real time 1001, when the stream will start playing. Stream 34 also starts at time 1001.

Note that in these examples of offset use, the streams are synchronised together. The choice has been whether to start the streams in a ragged fashion showing all data, or to jump forward to a time when all streams have data.

The timestamps are applied in a time data format having a 64 bit representation. Each timestamp is a 64 bit word interpreted as a 2's complement binary representation in units of $2\times10^{-32}$ second since GPS epoch(Midnight, Jan. 5, 1980). The top 32 bits represent binary GPS seconds, the bottom 32 bits binary fractions of each second. Thus low precision code uses just the top 32 bits as a 2's complement number of seconds since the GPS epoch. High precision code down to the nanosecond level can be accommodated by the bottom 32 bits, the time resolution of the system being about 0.2 ns.

With 2's complement the top bit of the 64 bit word represents whether the number is positive or negative. If the top digit is 0 the number is positive, if the top digit is 1 the number is negative. By specifying 2's complement rather than unsigned, and thus giving each timestamp a positive or negative value, library code can handle negative times, ie times before GPS epoch, in calculations. This time format is only valid for times between the years 1915 and 2045, i.e. until the positive time is reached at which the top bit is 1. This is sufficient for most multimedia timestamping requirements. Alternatively the rollover of the counting at year 2045 can be taken into account.

The use of 2's complement in the system ensures that negative numbers can be processed easily. This reduces the chance of user error when manipulating different data streams using the addition or subtraction of timestamps.

The retention of the original source timestamps allows data to be retrieved according to the times of recording (e.g. between 6 and 7 pm on 5th November), enables streams to be synchronised even if they have been recorded on different media, and makes it possible for a program to systematically add new audio and video tracks to an edited sequence, even where it has pauses, speed changes or other effects. The source timestamps also provide an unchanging reference time scale from which playback timestamps can be computed with no cumulative error after multiple edit.

The use of the GPS time standard makes high accuracy time hardware available worldwide, avoids problems with leap seconds, and is easily related to UTC. Discussion of GPS standards and associated accurancy figures when related to UTC are contained in 'Technical Characteristics of the Navstar GPS, NATO Navstar GPS Support Group, June 1991.'

FIG. 3 shows a schematic diagram of how timing sequences are applied by use of an ATM (Asynchronous Transfer Mode) computer network. The ATM Network 48 is a computer network which continuously sends small cells of information between individual processing sections and so controls the interaction of different sections such as a data collection section 50, a data storage facility 62 and a user display section 70. Switches 58,60 are provided within the network 48 to direct the cells. Each cell contains 53 bits of information with the network address of each cell being contained within a header 5 bits long. Each cell address is translated within the switches 58,60 and due to the small size of the header, the switches 58,60 process each cell quickly and direct them according to the network address. A network time protocol NTP is used to measure how fast the cells travel throughout the ATM Network 48. This allows for synchronisation between each section attached via the ATM Network 48.

Network time Protocols are discussed in, for example, Network Time Protocol (Version 2) by D.L. Mills in DARPA Network Working Group Report RFC-1119, University of Delaware, September 1989.

The data collection section 50 comprises a video camera 52, an Analogue to Digital(A/D) converter 54 and a processing unit and network interface 56. The video camera 52 converts an optical scene into a live video analogue data stream. This analogue signal is sent to the A/D convertor 54 for conversion to a digital signal before passing to the processing unit 56 where the first and second timing sequences are applied to the data stream. The processing unit and network interface 56 is typically provided by an Olivetti Research Laboratories ATMos board with a local digital clock signal. The software protocol defining the addition of the timing sequences containg the timestamps to the data stream is provided from the ATM Network 48.

The data storage facility 62 comprises a disc storage facility 64 sometimes known as a disc brick, a signal convertor 66 and a data processing unit 68. The data processing and interface unit 68 is typically another ATMos board and allows connection via switch 60 into the controlling ATM Network 48.

The user display section 70 comprises a video display unit 72, a D/A convertor 74 and a data processing and interface unit 76. The data processing unit and network interface 76 is similarly an ATMos board connected into switch 60.

A GPS receiver 78 receiving time pulses from GPS transmitters in orbit around the earth is used to provide the absolute time reference for the timing sequences. The receiver 78 is connected into the ATM Network 48 by a further ATMos board 80, typically by use of an RS 232 interface, and the switch 60. The time pulse from the receiver 78 is used to calibrate and synchronise the clocks on each of the ATMos boards. Typically the boards can be calibrated to within 100 μs although better accuracy can be achieved if necessary.

In use a video data stream from camera 52 has playback and source timestamps applied at ATMos board 56. An information cell comprising one or more timestamps is sent via switch 58 to the appropriate part of the processing network. Switch 58 allows combination of data streams from the data collection section 50 with those of the data storage facility 62. Data streams from the data storage facility 62 may be stored with timestamps or alternatively timestamps, in particular playback timestamps, can be applied to the data stream by ATMos board 68.

The different data streams are combined according to the playback instructions contained within ATMos board 76 and sent via the D/A converter 74 to the video display unit 72. The different data streams supplied through the ATM network 48 to the video display unit 72 can be synchronised or offset relative to each other depending on the software protocol supplied to the ATMos board 76 by the ATM network 48.

I claim:

1. A method of adding time information to a data stream the method comprising the steps of recording the data stream onto a storage medium, linking first and second timing sequences with the recorded data stream, the first sequence providing a permanent time record of when the data first originated; updating the second sequence when the data stream is subsequently edited, such that time information in the first sequence provides a permanent record of the originating time which is always maintained with any data preserved from the original stream, whilst the second sequence provides an internally consistent timetrack for the edited data stream, which timetrack therefore does not contain sequential discontinuities corresponding to those which may have been introduced into the first sequence by the editing of the data stream wherein the timetrack is updated each time the data stream is changed, to facilitate subsequent replay and further editing of the data stream.

2. The method of adding time information to a data stream according to claim 1, wherein the timing sequences are generated and transmitted with the data stream.

3. A method of adding time information to a data stream according to claim 1, wherein the data stream and timing sequences are buffered before being transmitted to reproduction apparatus.

4. A method of adding time information to a data stream according to claim 1, wherein the data stream and timing sequences are recorded in a linked manner and the timing sequence information is embedded in the data stream.

5. A method of adding time information to a data stream according to claim 4, wherein the first and second timing sequences are embedded into the data stream together.

6. A method of adding time information to a data stream according to claim 4, wherein the second timing sequence is embedded into the data stream after the first timing sequence.

7. A method of adding time information to a data stream according to claim 1, wherein the timing sequences are stored separately from the data.

8. A method of adding time information to a data stream according to claim 1, wherein the first permanent timing sequence is derived from an absolute reference.

9. A method of adding time information to a data stream according to claim 1, wherein the second timing sequence is in relative time units.

10. A method of adding time information to a data stream according to claim 1, wherein the timing information in the timing sequences is provided by a series of timestamps.

11. A method of adding time information to a data stream, according to claim 10, wherein the timestamps are applied using a 64 bit time data format.

12. A method of adding time information to a data stream according to claim 11, wherein the 64 bit time data format is interpreted as a 2's complement binary representation so as to allow negative times to be handled in the same format as positive times during calculations.

13. A method of adding time information to a data stream according to claim 10 wherein the series of timestamps is positioned along the data stream with varying spacing.

14. A method of adding time information to a data stream according to claim 13, wherein the first and second timing sequences have differently spaced timestamps.

15. A method of adding time information to a data stream according to claim 1 wherein the time information is added to a plurality of data streams, so as to allow linking of different data streams.

16. A method of adding time information to a data stream according to claim 1, wherein the timing sequences are used to synchronise live streams.

17. A method of adding time information to a data stream according to claim 1, wherein at least three timing sequences are stored with the data so as to allow the storage of at least two sets of second timing sequences, each of which corresponds to a different presentation of common sets of data streams.

18. Apparatus for performing any of the methods according to claim 1.

* * * * *